UNITED STATES PATENT OFFICE.

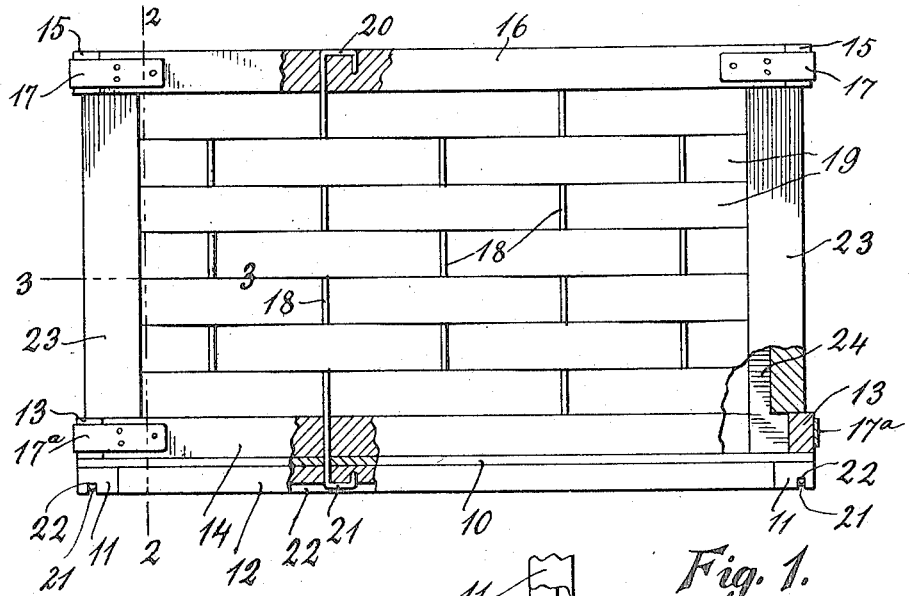
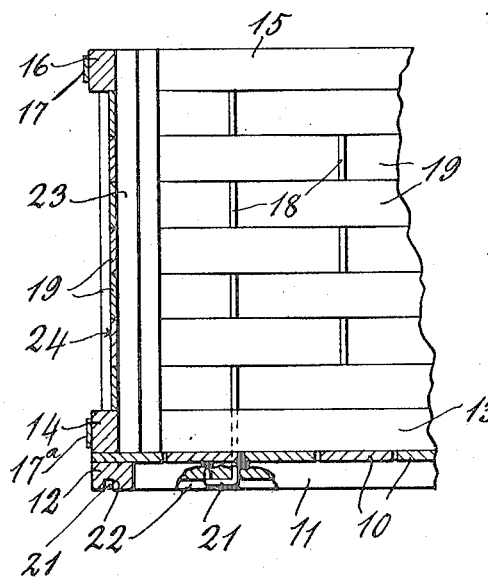

ARTHUR CLIFTON GOFF, OF BOYNE CITY, MICHIGAN.

BASKET.

1,206,430.

Specification of Letters Patent.

Patented Nov. 28, 1916.

Application filed January 31, 1913. Serial No. 745,388.

*To all whom it may concern:*

Be it known that I, ARTHUR C. GOFF, a citizen of the United States, residing at Boyne City, in the county of Charlevoix and State of Michigan, have invented certain new and useful Improvements in Baskets, of which the following is a specification.

This invention relates to baskets and analogous receptacles having side and end walls which are formed of flexible strips or splints which are woven in and out between uprights.

It is the object of the invention to provide a basket of this kind which can be easily and cheaply constructed, and which is strong and durable, and to this end the invention consists in a novel combination and arrangement of parts to be hereinafter described and claimed.

In order that the invention may be better understood, reference is had to the accompanying drawing in which—

Figure 1 is an end view of the basket. Fig. 2 is a vertical section on the line 2—2 of Fig. 1, and Fig. 3 is a horizontal section on the line 3—3 of Fig. 1.

Referring specifically to the drawing the bottom of the basket is composed of thin boards or strips of veneer 10 resting on side strips 11 and end strips 12. On top of the strips 10 are placed side and end strips 13 and 14, respectively, which are parallel to the strips 11 and 12 and form a ledge. The cross strips 10 are thus held at their ends between the strips 11 and 13, and the end ones of the series of cross strips are held between the strips 12 and 14. The cross strips are further secured by being nailed to the strips 11 and 12.

At the top of the basket is a rim which is composed of side and end strips 15 and 16. respectively, similar to the strips 13 and 14, and secured together by corner plates 17, the latter being nailed to the outer faces of the side and end strips. The strips 13 and 14 also have corner plates 17ª.

The side and end walls of the basket are composed of upright wires 18 and flexible horizontally extending strips 19 which are woven in and out between the wires and fill the space between the strips 13 and 15 at the sides of the basket, and the space between the strips 14 and 16 at the ends of the basket.

The wires 18 extend between the strips 13 and 15 at the sides of the basket, and between the strips 14 and 16 at the ends of the basket. The upper ends of the wires have hook-shaped bends 20 which are driven into the top edge of the strips 15 and 16, the wires passing entirely through said strips. The lower ends of the wires, at the sides of the basket, pass through the strips 13, through certain ones of the cross strips 10, and also through the strips 11, and terminate in hook-shaped bends 21 which are driven into the bottom of the strips 11, the latter having a longitudinal groove 22 which hides the bends, so that the bottom of the basket is left entirely smooth, in order that it may be drawn across the floor without scratching the same. The lower ends of the wires 18, at the ends of the basket, are secured in the same manner as the lower ends of the wires at the sides of the basket.

At the corners of the basket, inside the angles are set corner posts 23 which have vertical grooves 24 in two of their faces into which the ends of the flexible strips 19 seat and in which they are secured by nails or other suitable fasteners. The corner posts are shaped at their top and bottom ends to fit inside the angles made by the bottom strips 13 and 14, and top strips 15 and 16, and intermediate their ends the posts are shaped to fit between said top and bottom strips.

The parts arranged as herein described form a basket which is strong and durable, and which can be easily and cheaply made. The parts are nailed or otherwise fastened together wherever such fastening is necessary. The wires 18 hold the basket rigid at all times and enable the flexible strips 19 to be tightly drawn together.

I claim:

In a basket of the class described, comprising a bottom frame consisting of longitudinal and transverse members having continuous grooves in their under sides, a top rim, a floor formed of a series of strips secured to the bottom frame, a second frame resting on said floor at the outer edges thereof and consisting of longitudinal and transverse members, the said floor strips at their outer ends being held between said upper and lower frames, vertical wires extending between said frames and top rim, said wires having hooks at their ends provided with driving points, the points of the top hooks being driven into the top rim and the points of the bottom hooks being driven into the bottom frame within said grooves, flexible strips woven in and out between said wires to form the walls of said basket and corner posts secured to the said floor and top rim and having vertically extending grooves to form seats adapted for the reception of the ends of said flexible strips.

In testimony whereof I affix my signature in presence of two witnesses.

ARTHUR CLIFTON GOFF.

Witnesses:
 JOHN E. GETTY,
 NEWTON CONRAD.

Copies of this patent may be obtained for five cents each, by addressing the "Commissioner of Patents, Washington, D. C."